United States Patent
Blair

[11] 3,976,145
[45] Aug. 24, 1976

[54] FINISH TOOLS WITH MOUNTING BRACKET THEREFOR

[76] Inventor: Calvin B. Blair, P.O. Box 76, Barnard, Kans. 67418

[22] Filed: Mar. 19, 1975

[21] Appl. No.: 559,897

[52] U.S. Cl. ............................ 172/615; 172/198; 172/618; 172/639; 172/643; 172/712; 172/763; 403/162
[51] Int. Cl.² .................. A01B 23/04; A01B 49/02
[58] Field of Search .......... 172/198, 346, 617, 618, 172/627, 639, 643, 657, 691, 712, 762, 763, 776, 614, 615, 658; 403/4, 79, 117, 157, 161, 162

[56] References Cited
UNITED STATES PATENTS

| 344,804 | 7/1886 | Beebe | 172/712 |
| 461,334 | 10/1891 | Harvey | 172/148 |
| 508,398 | 11/1893 | Beach | 172/346 |
| 1,798,739 | 3/1931 | Hoiland | 172/658 |
| 2,619,887 | 12/1952 | Burrows | 172/259 |
| 2,735,251 | 2/1956 | Dlugosch | 403/157 X |
| 3,263,757 | 8/1966 | Kaster | 172/198 |

Primary Examiner—Richard C. Pinkham
Assistant Examiner—Richard T. Stouffer
Attorney, Agent, or Firm—Fishburn, Gold & Litman

[57] ABSTRACT

An inverted U-shaped bracket is designed to flexibly mount transverse harrow tine supporting bars for independent movement of each other upon longitudinally extending implement carrier arms to permit drag angle adjustment and ability to back up without digging in.

4 Claims, 6 Drawing Figures

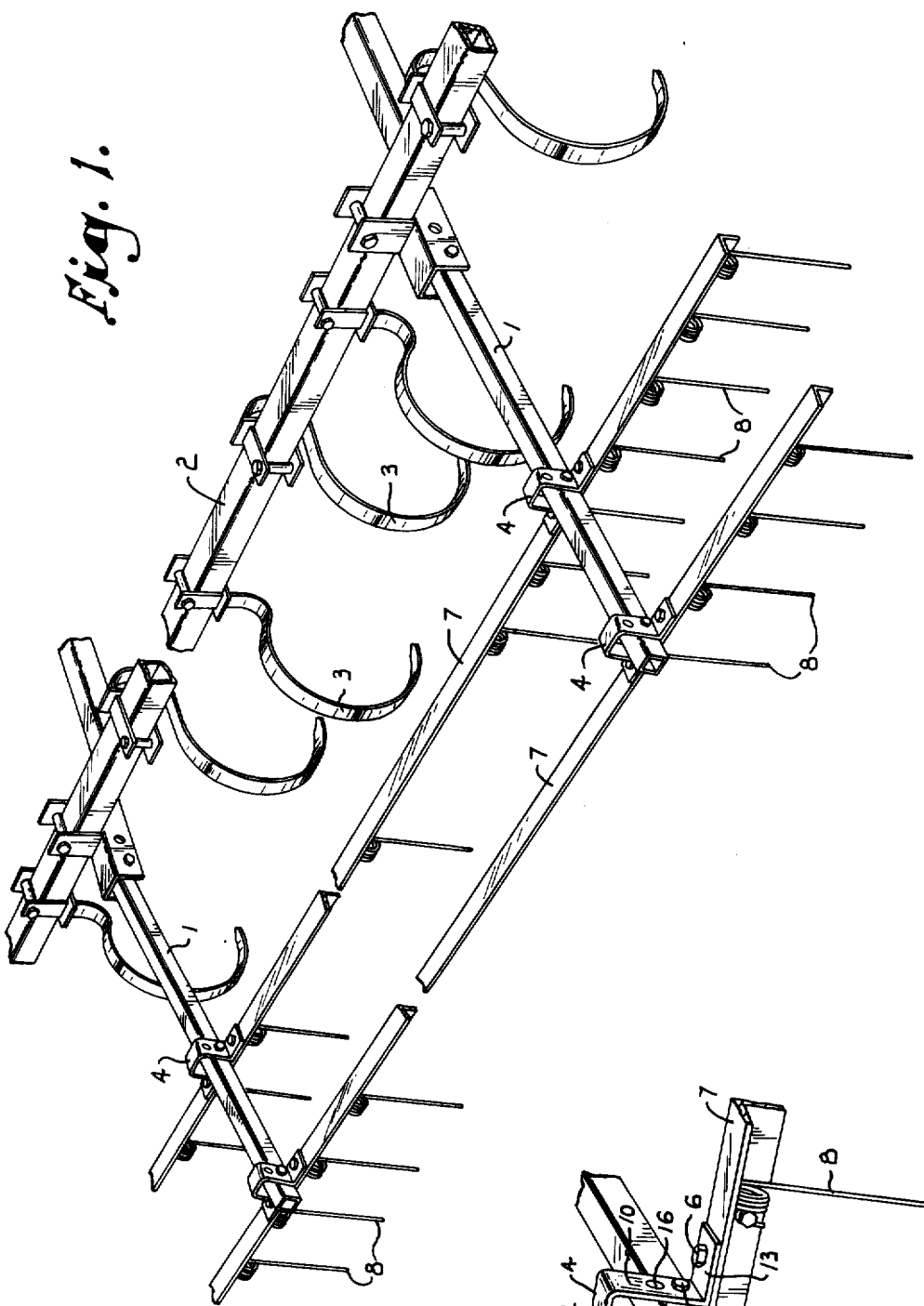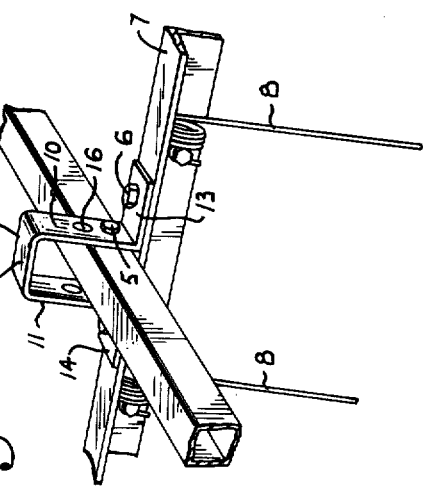

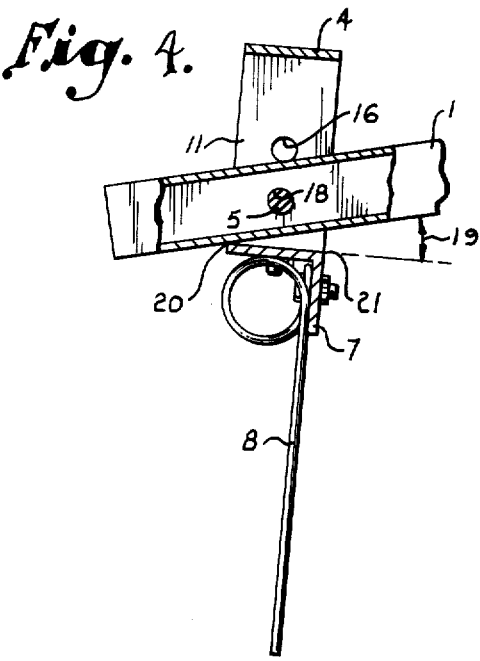
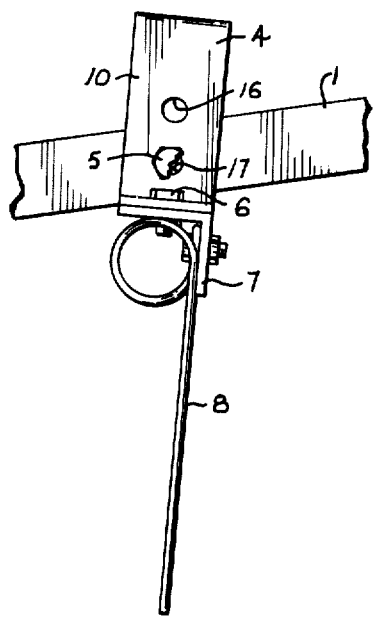
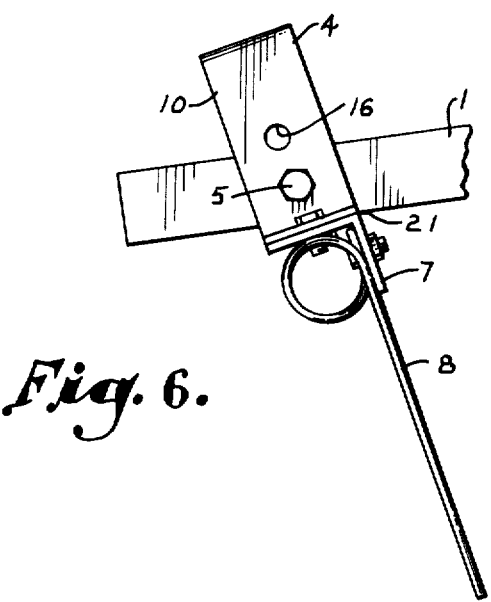
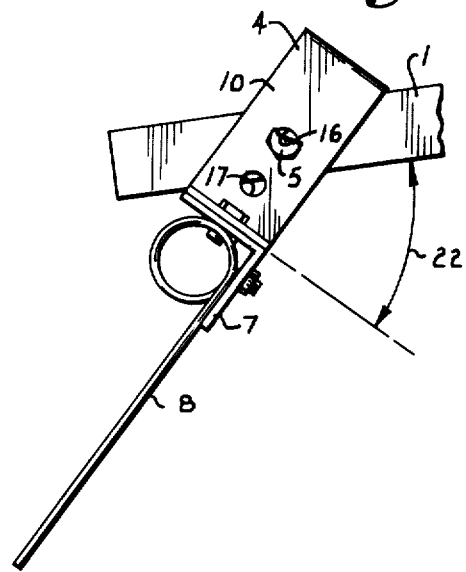

FINISH TOOLS WITH MOUNTING BRACKET THEREFOR

This invention relates to a mount for farming tools and, more particularly, to an adjustable bracket which permits the flexible mounting of harrow tine bars, and the like, upon carrier arms.

In recent years, the design of agricultural implements has emphasized both greater width and multiple functions to reduce tillage time. One example of this has been to add rows of coil spring harrow teeth behind a wide, wheeled spring-tooth or chisel frame. The wide, multiple, function implement has created problems in transport and field turning due to the varying characteristics of the tools carried. Thus, backing is permissible with a springtooth, but could cause digging in and breakage with a coil harrow tooth. Further, independent adjustability of the various types of tools becomes important since they must optimally cooperate under varying field conditions.

In the practice of this invention a simple bracket mounts transverse harrow tine bars to longitudinal implement arms in a manner which permits easy adjustability of the tine angle and freedom to reverse drag angle in case of backing, avoiding stresses caused by digging in.

The principal objects of the present invention are: to provide an adjustable mounting bracket for harrow tine bars which allows both forward and rearward movement without the necessity of raising the tines from a terrain contacting position; to provide such a bracket which tends to reduce tooth breakage and permits more freedom of implement operation; to provide such a mounting arrangement which is simple and inexpensive in construction; and to provide such a mounting structure which is extremely well adapted for its intended purpose.

Other objects and advantages of this invention will become apparent from the following description taken in connection with the accompanying drawings wherein are set forth by way of illustration and example, certain embodiments of this invention.

FIG. 1 is a fragmentary perspective view showing the mounting brackets utilized in supporting two harrow tine bars on implement carrier arms hinged to a springtooth frame.

FIG. 2 is a fragmentary perspective view on a larger scale showing a bracket in more detail.

FIG. 3 is a fragmentary side elevational view of the bracket in low angle forward motion position.

FIG. 4 is a view similar to FIG. 3 but with portions broken away to illustrate bracket rotation stop contact with the carrier arm.

FIG. 5 is a side elevational view similar to FIG. 3 but showing the bracket adjusted to high angle drag.

FIG. 6 is a side elevational view similar to FIG. 3 but showing a position taken during backing.

Referring to the drawings in more detail:

Generally horizontal carrier arms 1 extend rearwardly from and are pivotally attached to a wheeled implement frame 2 carrying spaced springteeth 3. At spaced, aligned intervals on the carrier arms 1, retainers or mounting brackets 4 are pivotally mounted by means of pin members or bolts 5 extending therethrough and through arms 1 as described further below. Bolts 6 mount the brackets 4 to transversely extending bars 7 which support spaced coil harrow tines 8 therealong.

The brackets 4 are of generally inverted U-shape, having spaced side walls 10 and 11, top wall 12 extending therebetween and lower feet 13 and 14 which project laterally outwardly from the respective walls 10 and 11. The feet 13 and 14 receive the bolts 6 therethrough to mount the bracket on the tine bars 7. Transversely aligned pairs of openings 16 and 17 extend through the side walls 10 and 11, in this example openings 16 being located directly above openings 17, however other relative positions may be selected. The bolts 5 pass through a selected pair of openings 16 or 17, as noted below, and through openings 18 in the carrier arms 1. Suitable nuts, not shown, threadedly engage the bolts 5 to secure the assembly.

The pairs of openings 16 and 17 are spaced above the feet 13 and 14 varied distances so that the brackets 4 are permitted to rotate through different angles before the bars 7 strike the carrier arms 1. Thus, FIG. 4 illustrates the drag angle 19 of the tine mount bar 7 when the bracket 4 is mounted by means of the lower openings 17, the clockwise limit of bar rotation being determined by contact at point 20. If the implement is moved backwards with the tines 8 contacting the ground, the bracket 4 will permit the bar 7 to rotate counterclockwise until the point 21 contacts the arm 1, allowing reverse drag rather than digging in of the tines, FIG. 6.

Referring to FIG. 5, the upper openings 16 are utilized to mount the brackets 4 whereby the drag angle 22 is considerably greater than the angle 21. Upon backing, the same reversal as noted above will take place, but at a greater angle.

It is to be understood that while certain forms of this invention have been illustrated and described, it is not to be limited thereto except insofar as such limitations are included in the following claims.

What is claimed and desired to secure by Letters Patent is:

1. In combination:
   a. at least two draw carrier arms adapted for mounting on an implement frame and extending longitudinally of the direction of motion thereof;
   b. at least two bars each being spaced apart along the longitudinal extent of said arms and having a plurality of laterally spaced harrow tines supported thereon and depending therefrom, said bars extending transversely of said carrier arms, and
   c. respective bracket means mounting each one of said bars to each of said arms and forming with said arms the only connection between said bars, each of said bracket means comprising a retainer having a first upstanding side wall positioned adjacent one of said arms,
   d. each of said bracket means further comprising means on said side wall securing same to one of said bars, and means associated with said side wall rockingly mounting same to one of said arms and fixing said one of said bars longitudinally to said one of said arms so as to prevent movement of said one of said bars along the longitudinal exent of said one of said arms,
   e. said rocking mounting means being positioned a first distance from said one of said bars, each one of said bars thus being mounted by said bracket means to each of said arms so as to be free to move independently of the other of said bars through a first angle with respect to said arms.

2. The combination as called for in claim 1 wherein:
   a. said bracket means comprise an inverted U-shaped retainer each having a second upstanding side wall positioned on an opposite side of one of said respective arms from said first upstanding side wall;
   b. a mounting foot on each said side wall and projecting laterally therefrom, and means securing each said foot to said bar.

3. The combination as set forth in claim 1 including:
   a. a pair of aligned openings in said side wall and spaced above said side wall securing means, said means associated with said side wall comprising a pivot pin member selectively extending laterally through one of said side wall openings and pivotally mounting said retainer to said arm,
   b. said openings being spaced above said side wall securing means said first, and a second distance permitting said rocking of said bar about said arm through said first and a second angle respectively restricted by contact between said bar and arm.

4. The bracket as set forth in claim 3 wherein:
   a. said pivot pin member is a removable bolt.

* * * * *